United States Patent
Gunn et al.

(10) Patent No.: US 6,464,365 B1
(45) Date of Patent: Oct. 15, 2002

(54) LIGHT COLLIMATOR FOR LIQUID CRYSTAL DISPLAYS

(75) Inventors: Thomas V. Gunn, Candia, NH (US); Wesley H. Halstead, Sammamish, WA (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 09/621,142

(22) Filed: Jul. 21, 2000

Related U.S. Application Data

(60) Provisional application No. 60/145,550, filed on Jul. 23, 1999.

(51) Int. Cl.[7] ............................................... F21V 7/04
(52) U.S. Cl. ........................... 362/27; 362/31; 362/331; 362/551; 349/62; 359/620
(58) Field of Search ........................... 362/26, 27, 331, 362/551, 31; 349/47, 62; 359/619, 620

(56) References Cited

U.S. PATENT DOCUMENTS

| | | | |
|---|---|---|---|
| 5,310,623 A | | 5/1994 | Gal |
| 5,396,406 A | * | 3/1995 | Ketchpel ................... 362/27 |
| 5,482,800 A | | 1/1996 | Gal |
| 5,497,269 A | | 3/1996 | Gal |
| 5,600,486 A | | 2/1997 | Gal et al. |
| 5,781,257 A | | 7/1998 | Gal et al. |
| 6,299,328 B1 | * | 10/2001 | Wilson ...................... 362/223 |

\* cited by examiner

*Primary Examiner*—Sandra O'Shea
*Assistant Examiner*—Ali Alavi
(74) *Attorney, Agent, or Firm*—Scott J. Asmus; Vernon C. Maine; Maine & Asmus

(57) ABSTRACT

A collimator is provided to collimate light from a lambertian light source in which light from a fluorescent lamp is reflected towards an exit slit and in which light which leaves the slit at 180 degrees and is collimated in one direction to +/−1/2 degree. The collimator is utilized in one application to maximize the diffraction efficiency of a diffractive color separator microlens array to increase the brightness of a color liquid crystal display and to increase color saturation. In order to provide collimation, the light exiting the exit slit is collimated by parabolic surfaces of an optical waveguide to provide a beam which has a collimation of +/−3 degrees in one direction. This light in one embodiment is spread out by a reflective array and is further collimated by a cylindrical lens array so that it exits a panel with the required +/−1/2 degree collimation.

13 Claims, 7 Drawing Sheets

LIGHT COLLIMATOR FOR LIQUID CRYSTAL DISPLAYS

This application claims the benefit of Provisional Application No. 60/145,550, filed Jul. 23, 1999.

FIELD OF INVENTION

This invention relates to light sources and more particularly to a light source capable of providing highly collimated light in at least one direction for use in increasing the brightness and color saturation of color liquid crystal displays.

BACKGROUND OF THE INVENTION

It will be appreciated that color liquid crystal display panels are routinely utilized in laptop computers. However, these displays are not generally sunlight viewable due to the reflection of the sunlight back towards the viewer. In an effort to provide such displays with enough brilliance and enough color saturation to be able to be viewed in direct sunlight, recently a liquid crystal display has been provided with a microlens array in which the colors from a light source are separated out into distinct patches which illuminate the various red, green and blue sub-pixels associated with the display.

It is important in the microlens arrays that the diffraction gratings be illuminated by collimated light. The reason that this is important is that the surface structure of the diffraction grating provided by the microlens display is calculated utilizing a collimated light source. When the light source is not collimated, the image produced by the diffraction grating along with the fresnel focusing used by the microlens is defocused or smeared out. This means that for instance red light which is to be focused on a red sub-pixel in the liquid crystal display can in certain instances be smeared out sufficiently to overlap an adjacent green sub-pixel.

In order to assure that such smearing does not occur, it is important to provide a light source which is at least collimated in one direction with respect to the liquid crystal display.

In the past, displays having collimated light sources have been utilized to eliminate various pixel effects produced by a display. By pixel effects is meant off-angle, gray-scale changes and color inversion. It is, however, only with difficulty that a compact collimated light source can be provided.

It will be appreciated that collimated light sources as applied to liquid crystal displays are not common due to the difficulty of incorporating a collimated light source in a relatively thin display module. It will also be appreciated that semi-collimated light sources are utilized in projection liquid crystal display systems in which very bright light point sources are utilized. However, collimation must take place over an extended distance unsuitable for laptop computers and other applications where space is at a premium.

As is well known, collimated light can be achieved simply by removing the 360 degrees light source a large distance from the intended point of use. However, most of the light is lost in such an arrangement. In order to provide for more intense collimated light, reflectors are required which redirect the light available from the source and project it in a single direction. The length and configuration of such reflectors is unusable in portable display applications.

By way of further background collimation is taken to mean that the light from a source is emitted in a given direction and diverges by no more than some small angle. It is the purpose of a light collimator to assure that all of the light coming out of the source travels along a given direction. Typically when a slit source is utilized, the light from the slit exits in an arc are bounded by 180 degrees.

SUMMARY OF THE INVENTION

In the subject invention a lambertian light source in the form of a fluorescent tube is used with light exiting a slit redirected and collimated using an optical waveguide with parabolic surfaces, each having a focus at an opposing exit slit edge. In one embodiment, this collimated light is folded back on itself and is both expanded by a reflective array to provide an extended light source (a panel of light) and is further collimated by cylindrical lens array.

In one embodiment a diffuse reflector used around the fluorescent tube for maximum efficiency in condensing the light to a narrow slit, similar to an integrating sphere. The diffuse reflector is able to direct light from the fluorescent tube to a relatively narrow slit at an efficiency of 75%. The result is that a large amount of light is available at the exit slit.

However, the light available at the slit is not collimated. By utilizing an optical waveguide in which the surfaces are parabolic it is possible, in one instance, to collimate the 180 degree light into a beam of +/−3 degrees along in the horizontal direction assuming the lamp and slit are oriented vertically. By providing top and bottom parabolic surfaces to the waveguide, it is possible to collimate light in the vertical direction to +/−10 degrees. The foci of these parabolas are set such that a parabola has its focus at an opposing edge of the exit slit.

In one embodiment, the collimated beam is folded back by two 45° mirrors, with the light being redirected towards an entrance port of a reflective array in which the array has 45 degree reflectors spaced along its back edge. The purpose of the reflection array is to distribute the light across the extended area of an LCD panel. To accomplish this, the array of reflectors reflects the light, via total internal reflection, down the array at right angles where it exits a face of the array. The face of the array in one embodiment is provided with collimating lenses which are cylindrical, whereby the exiting light in the horizontal direction is collimated to a +/−½ degree angle; with light exiting in the vertical direction collimated to +/−15 degrees.

It will be appreciated that having light collimated to a +/−½ degree angle permits a microlens diffraction separator array to provide a high degree of color separation. Note, the collimation in the vertical direction is not as important in one embodiment due to a horizontal arrangement of the sub-pixels in the associated liquid crystal display in which the red, green, and blue sub-pixels are arrayed on a horizontal axis. Since the light from the subject collimator is highly collimated in the horizontal direction, color separation is adequate. On the other hand, the light being not so highly collimated in the vertical direction does not deleteriously affect the display. This is because the colored light will merely fall on a sub-pixel having the same color.

What has been described in one embodiment involves a 1 millimeter exit slit and a parabolic waveguide of approximately 6 inches in length. In a second embodiment, a much more compact collimator is provided by making the effective width of the exit slit on the order of a couple of microns in width. In this embodiment the extended waveguide is replaced with a thin waveguide sheet having a number of side-by-side internal parabolas formed therein. The entrance apertures for these parabolas are in the micron range to give an equivalent exit slit in the micron range. The portions of the sheet adjacent the apertures are provided with highly reflective material such that light not entering the very small apertures is reflected back towards the light source and then re-reflected or redirected by the reflector back towards the sheet. As a result the amount of space required to provide the collimated light is drastically reduced due to the provision of the waveguide sheet and the subminiature apertures involved. As before, the parabolas are configured such that the parabolic surface of one side of a parabola is focused at an edge of the opposing exit slit.

It will be appreciated that while the subject invention has been described in terms of parabolic shapes for the waveguide, other shapes which are called non-imaging collimator shapes can be substituted to provide for a more uniform intensity output across the aperture of the waveguide.

As will be discussed, the parabolas in one embodiment are generated through the utilization of a program which is written in FORTRAN modified with special calls by ASAP optical design code.

In one embodiment the waveguide is made of a clear acrylic, although any clear non-diffuse glass is substitutable therefor with appropriate modification in dimension due to index of refraction differences.

As mentioned, the subject collimator may be utilized in a liquid crystal display in which microlenses are used to focus regions of color towards associated sub-pixels in the liquid crystal display. One such arrangement is shown in U.S. Pat. No. 5,600,486, incorporated by reference, which describes a color separation microlens. This type of microlens array can, as illustrated in U.S. Pat. No. 5,781,257, incorporated by reference, be utilized in a flat panel display. In both cases the color separation depends upon collimated light which can be provided by a subject collimator.

Moreover, as illustrated in U.S. Pat. Nos. 5,482,800 and 5,310,623, both incorporated by reference, methods are described for fabricating the above mentioned microjenses. Finally, U.S. Pat. No. 5,497,269, incorporated by reference, shows a dispersive microlens used for detecting multiple, different wavelengths and for combining a plurality of different, emitted wavelengths.

In summary, a collimator is provided to collimate light which originally leaves an exit slit at 180 degrees and is collimated in one direction to a +/−½ degree angle; and in an orthogonal direction at +/−15 degrees. The collimator is utilized in one application to maximize the diffraction efficiency of a diffractive color separator microlens array to increase the brightness of a color liquid crystal display and to increase color saturation. In order to provide collimation, the light exiting an exit slit of a lambertian light source in the form of a fluorescent lamp is focused by parabolic surfaces of an optical waveguide to provide a beam which has a collimation of +/−3 degrees in one direction and +/−10 degrees in an orthogonal direction. In one embodiment, the beam is folded back on itself and is injected into a stepped reflective array which is provided with a stepped back surface that reflects the injected light and presents it across a broad panel. The panel is provided with cylindrical collimating lenses which further collimate the light in the original direction to a +/−½ degree angle. Collimation in the orthogonal direction is +/−15 degrees in one embodiment. The folded nature of the collimated light source permits compactness with the collimated light distributed across a wide surface to provide a panel from which collimated light exits. The walls of the collimator are parabolic, with the parabola of a wall of the waveguide having its focus at the opposing edge of the exit slit. The collimation in the orthogonal direction is provided by providing the waveguide with parabolic top and bottom surfaces, with the parabolas of these surfaces having their foci at opposite top or bottom edges of the exit slit. For an extended collimated light source the folded collimated light sources can be stacked or arranged so as to provide a wide panel of collimated light, at least in one direction. For an ultra thin collimated source, a sheet containing side-by-side internal parabolas is substituted for the extended optical waveguide and is placed adjacent the exit slit of the lambertian light source, with the entrance apertures in the sheet having a width in the micron range.

BRIEF DESCRIPTION OF THE DRAWINGS

These and other features of the Subject Invention will be better understood in connection with the Detailed Description in conjunction with the Drawings, of which.

DETAILED DESCRIPTION

Figure 1:
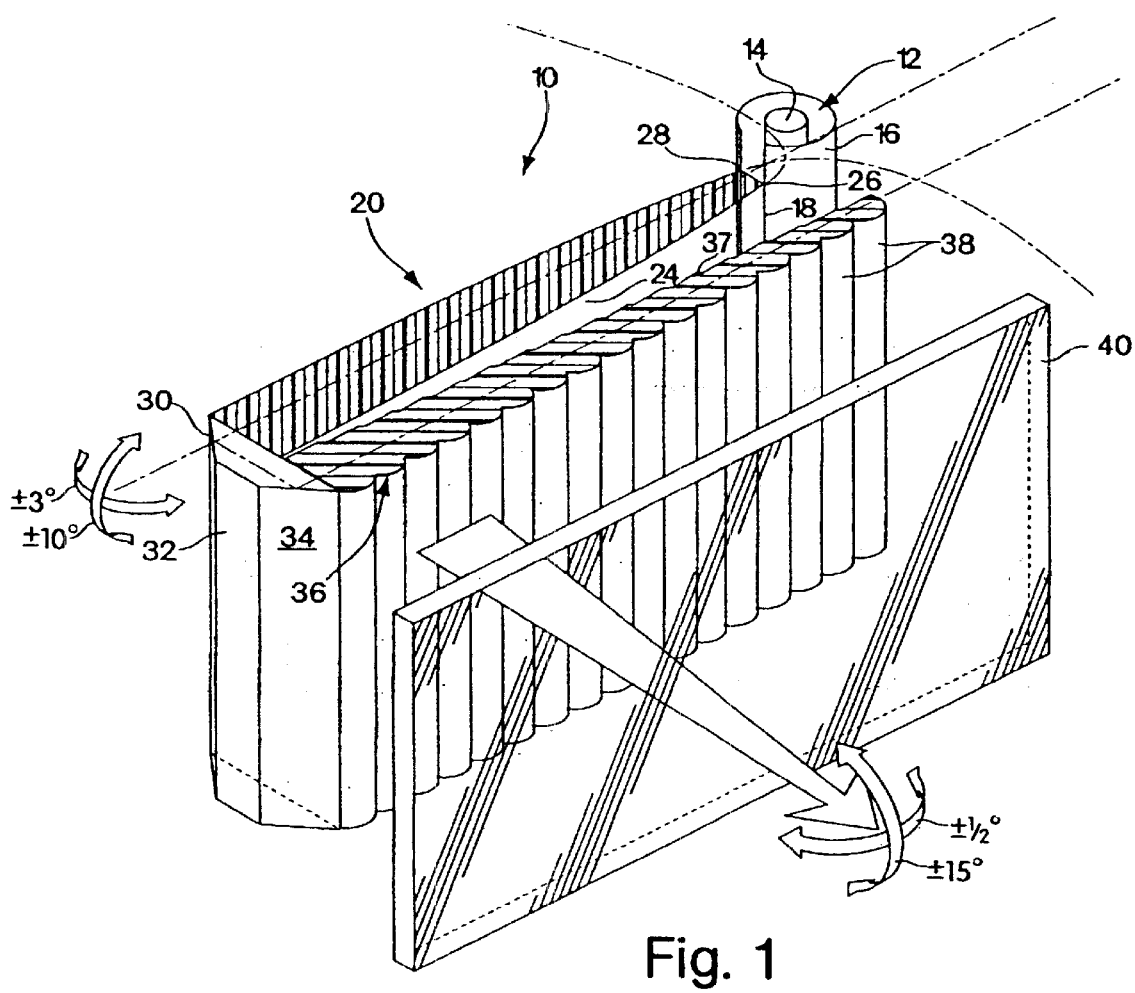
FIG. 1 is a diagrammatic and isometric view of the subject collimator in which a parabolically shaped waveguide projects collimated light from a lambertian light source, the output of which is redirected and folded back through a reflective array which is provided with 45 degree reflectors to provide a panel of collimated light.

Referring now to FIG. 1, a collimator 10 in one embodiment collimates the light from a lambertian light source 12 that in a preferred embodiment includes a fluorescent tube 14 which has a longitudinal axis therethrough. Tube 14 is surrounded by a diffuse reflector 16 which has an exit slit 18, with the edges of exit slit 18 providing the focus for opposed parabolas of a waveguide, illustrated here at 20.

It will be appreciated that waveguide 20 in one embodiment is made of a transparent material, conveniently acrylic or glass, in which sides 22 and 24 of the waveguide are parabolic. The parabolas for this waveguide have a focus at an opposed edge of the exit slit such that for instance, parabolic surface 22 has its focus 26 at the edge which is said to opposes this surface. Likewise parabolic surface 24 has its focus 28 at the indicated edge.

It is the purpose of the parabolic surfaces of waveguide 20 to redirect the light from the exit slit of the light source such that light which is normally dispersed in an arc of 180 degrees is redirected down the wave guide and exits exit aperture 30 of waveguide 20, with a collimation of +/−3 degrees in the horizontal direction. The collimation of the light in the vertical direction is plus or minus 10 degrees, with the collimation being performed as illustrated in FIGS. 2 and 3 by top and bottom portions of the waveguide which also have parabolic surfaces. As used herein, this type of parabolic arrangement is referred to as a crossed parabolic collimator.

The light exiting aperture 30 is folded back on itself by 45 degree mirrors 32 and 34 into a reflective array 36 which functions to redirect the light down through the array at a direction normal to the light path for providing an extended panel of illumination, with the light being collimated in the horizontal direction to +/−½ degree. In order to collimate the light in the horizontal direction, reflective array 36 is provided with a number of cylindrical lenses 38 on the face thereof. These lenses serve to further collimate the +/−3 degree collimated light from waveguide 20 such that the +/−½ degree collimation is achieved in the horizontal direction.

Note that the original collimation of +/−10 degrees for the vertical direction is somewhat degraded such that the collimation in the vertical direction is degraded to +/−15 degrees. However, mentioned above, the vertical collimation degradation is not important when the subject collimator is utilized for liquid crystal displays in which the sub-pixels are laid out in a horizontal direction. It will be appreciated that the degradation in the vertical direction is due to the emission of light from the array into free air.

This light is projected in one embodiment towards a color liquid crystal display here shown in dotted outline by reference character 40, with the characteristic of this display being that it is provided with a microlens array between the light source and the liquid crystals themselves, with the liquid crystal display sub-pixels being arrayed as red, green, and blue sub-pixels in the horizontal direction. It is important in this type of liquid crystal display that the incoming light be collimated to a fairly high degree. If the incoming light is not collimated, as mentioned hereinbefore, there will be a smearing out of the colors, such that color separation is difficult to maintain.

Figure 2A:
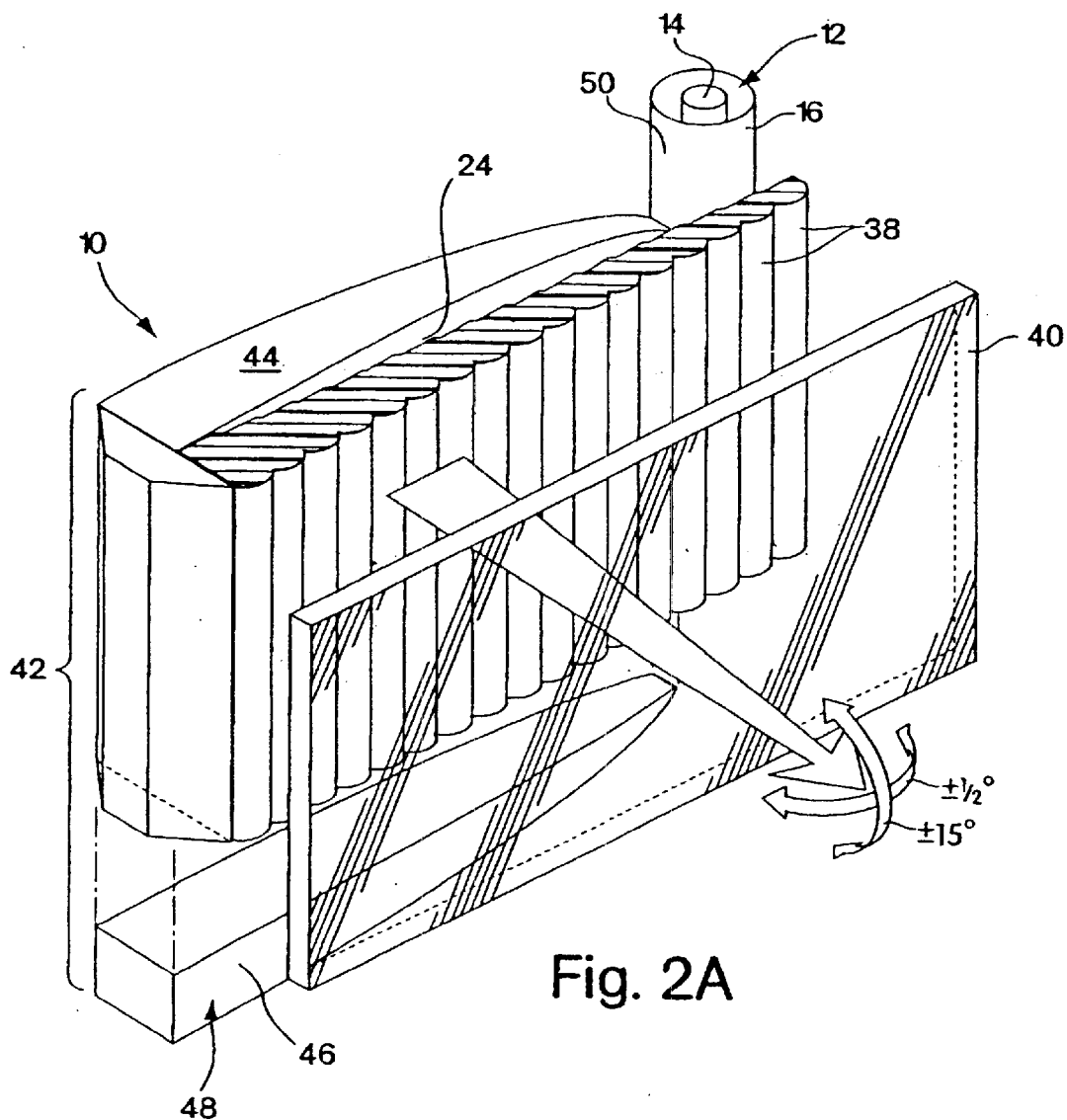
FIGS. 2A–C are diagrammatic illustrations of the collimator of FIG. 1 showing the addition of top and bottom parabolically shaped portions of the waveguide to provide collimation in a direction parallel to the axis of the fluorescent tube utilized to provide the lambertian light source.
Figure 3:
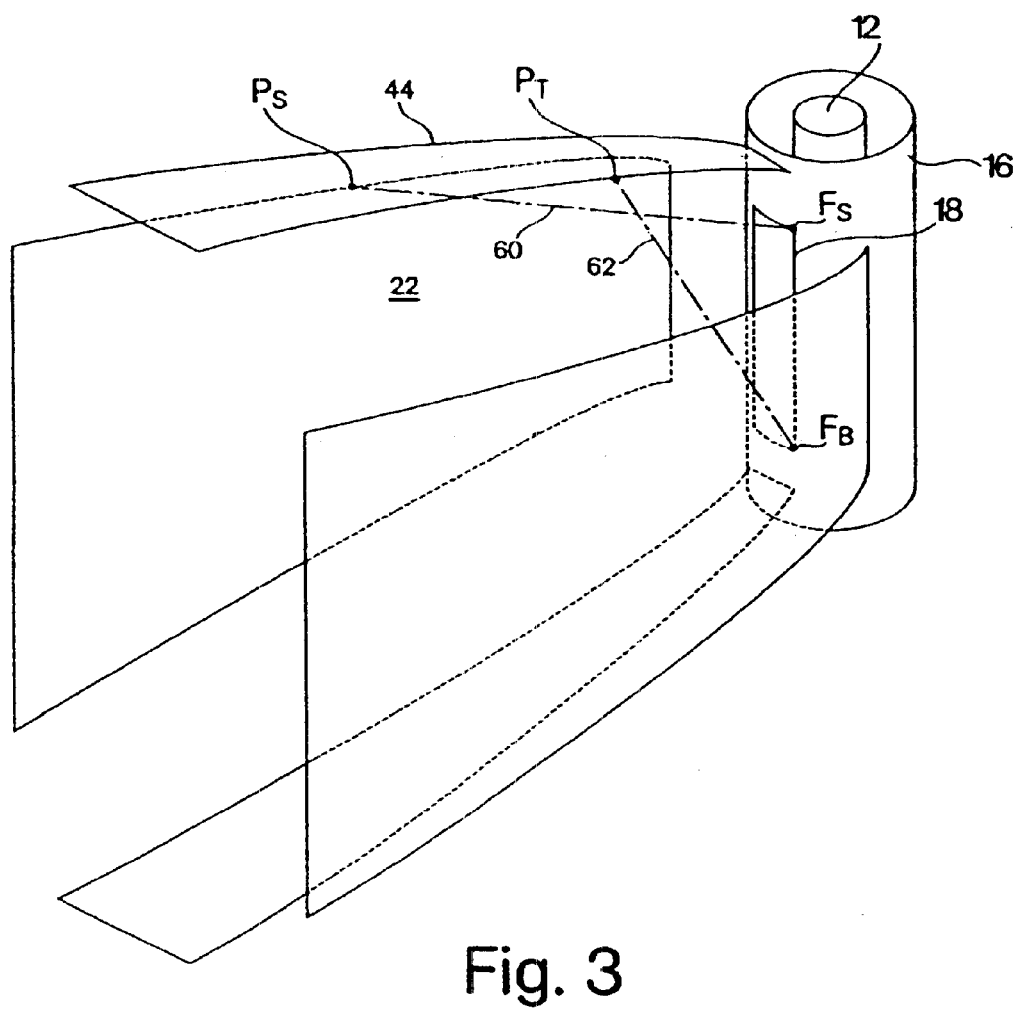
FIG. 3 is a diagrammatic representation of the initial collimating elements showing the parabolic surfaces used therefor.

Referring now to FIG. 2A, an exploded view of collimator 10 illustrates how the remainder of the parabolic collimator is provided. Here a top portion of waveguide 10 is illustrated at 42 which has a parabolic surface 44 that has as its focus the bottom edge of exit slit 18. Likewise, a bottom portion of collimator 10, here illustrated at 46, carries with it a parabolic surface 48, with the focus of this parabola being the top edge 50 of exit slit 18.

Figure 2B:
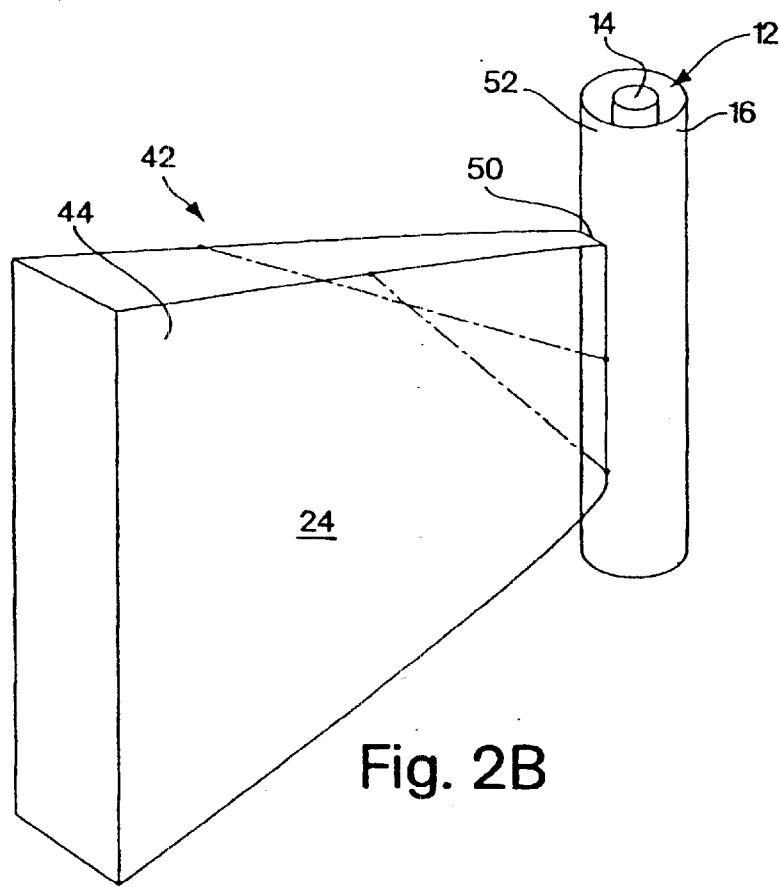
Figure 2C:
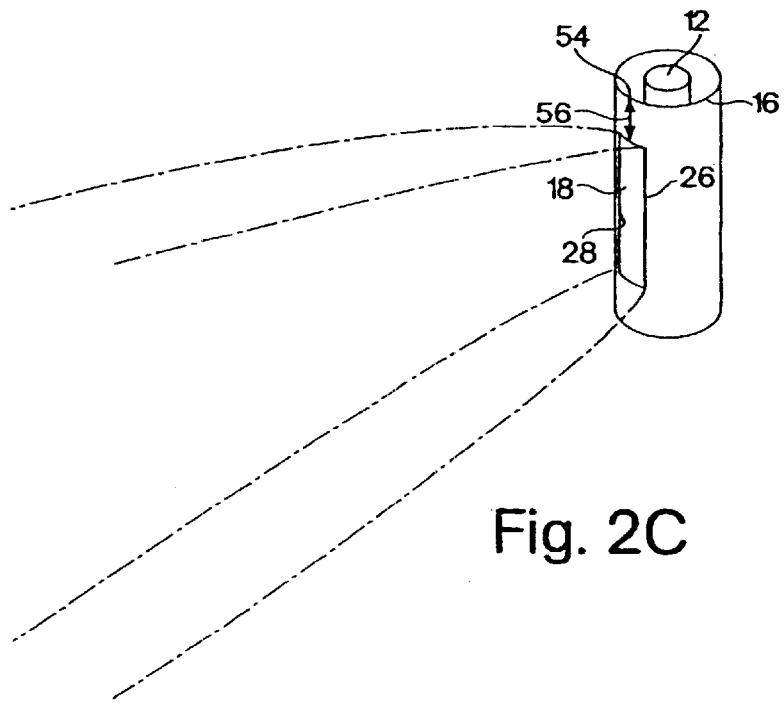

Referring now to FIG. 2B, it will be appreciated that the entrance aperture 50 of parabolic surface 44 is moved down reflector 16, with reflector 16 extending above edge 50. It will be also appreciated that as illustrated in FIG. 2C, exit slit 18 in reflector 16 is spaced from top edge 54 by a distance illustrated by arrow 56.

Referring now to FIG. 3 what is illustrated are the crossed parabolic elements of the collimator showing the generation of the parabolic surfaces based on the edges of exit slit 18. Here it can be seen that a point $P_S$ on surface 22 is generated as illustrated by line 60 from focus $F_S$ which is on the opposed edge of exit slit 18.

Likewise, a point $P_T$ on the top parabolic surface 44 is, as illustrated by line 62, focused on a point of $F_B$ is on an edge 64 which is opposed to the top parabola.

Figure 4:
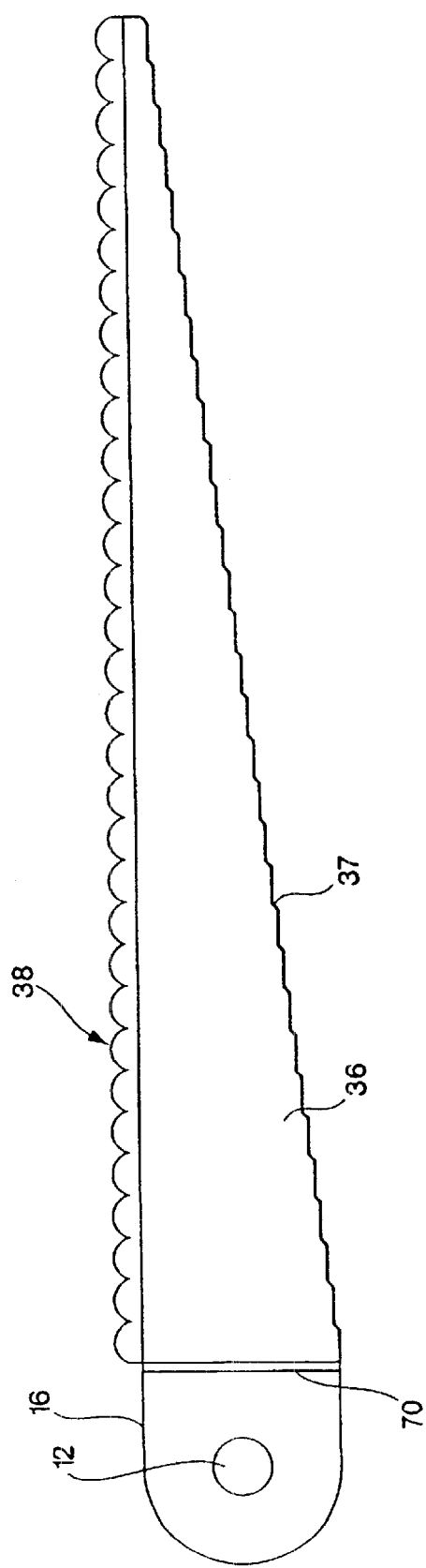
FIG. 4 is a side view of a collimating light source utilizing a collimating sheet as opposed to a collimating waveguide, showing the sheet being positioned between a fluorescent tube light source and the end of a reflective array with 45 degree stepped reflector elements and collimating lenses on the face thereof.

Referring now to FIG. 4, while in FIGS. 1 through 3 an extended collimator is illustrated in which waveguide 20 typically is on the order 6 inches long, there are applications for which that amount of space is not available. In the embodiment illustrated in FIG. 4, light source 12 along with its reflector 16 is positioned to one side of a collimating sheet 70 placed at the entrance aperture of reflective array 36 which has the same cylindrical lens array 38 on the front surface thereof as described in connection with FIG. 1.

Figure 5:
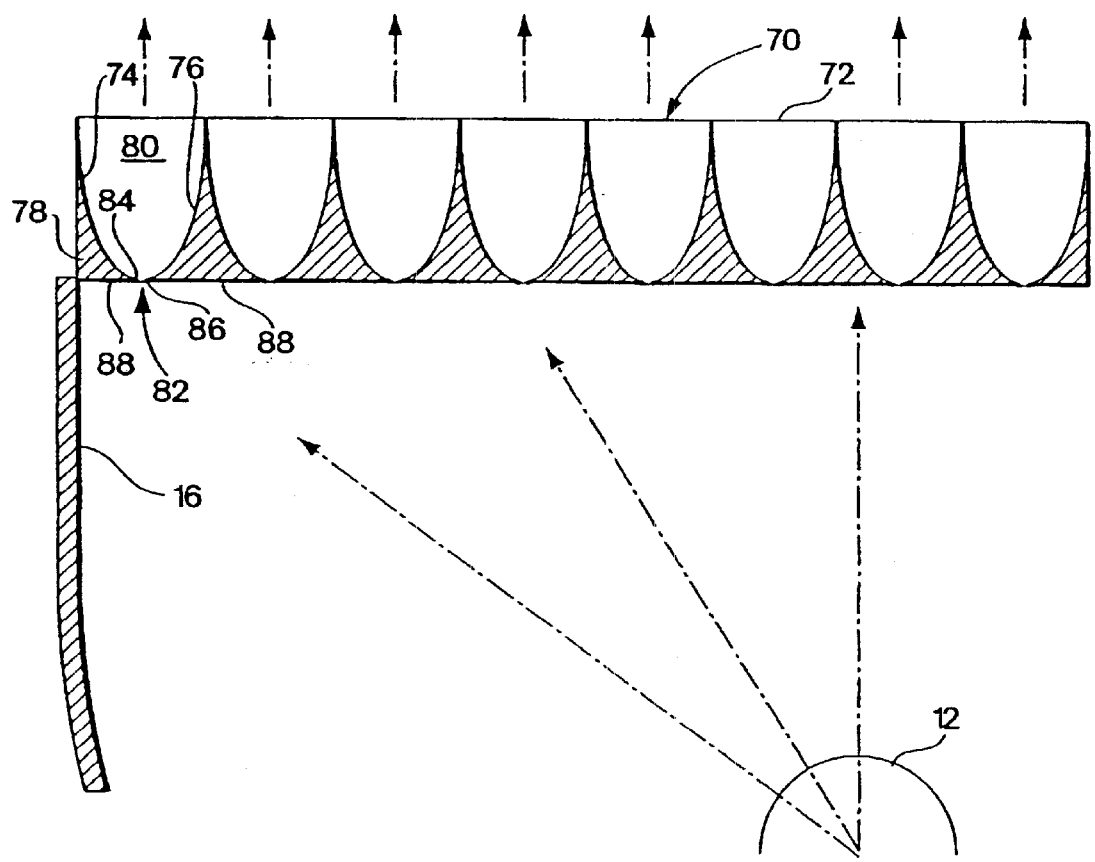
FIG. 5 is a diagrammatic illustration of the collimating sheet of FIG. 4 in which the sheet is provided with internal parabolic reflectors, each of which is focused on an edge of a slit which opposes the parabolic reflector; and, FIG. 6 is a diagrammatic representation of a light source for use with the collimating sheet of FIG. 5 in which either a serpentine fluorescent tube is utilized or in which a plurality of parallel mounted fluorescent tubes are used to eliminate the need for the reflective array of FIG. 4.

Referring now to FIG. 5, in order for the collimator to be made compact, it is important that the entrance apertures for the collimator be exceedingly narrow. While in the embodiment of FIG. 1 the width of the exit slit was on the order of millimeters, in order to collapse the distance required for the collimator, the slit-like entrance apertures of sheet 70 must be in the micron range. One cannot go much smaller than the micron range because the structure produced will have diffractive qualities which are not intended.

As can be seen in FIG. 5, sheet 70 has a top surface 72 and a bottom surface 88. The sheet generally is made of metal, silicon, or glass in which parabolic surfaces 74 and 76 are provided. In one embodiment the sheet is made of metal as illustrated at 78 and the surfaces are etched into the metal, leaving voids 80 therebetween. Alternatively voids 80 can be filled with transparent material such as glass or plastic to protect the reflective surfaces.

For each of the parabolas there is a slit-like aperture generally illustrated at 82 which is bounded by edges 84 and 86, with the width of apertures 82 being in the micron range. The parabolas may have the crossed parabolic structure as described in FIGS. 1–3. Alternatively, the parabolas may be cylindrical symmetrical parabolas.

As illustrated, the space between apertures 82 of adjacent parabolas is provided with a reflective coating 88 to reflect back any light from light source 12 which does not enter the associated aperture. This light is reflected back towards the apertures by reflector 16 such that eventually all or nearly all the light from light source 12 is collimated and exits sheet 70.

Figure 6:
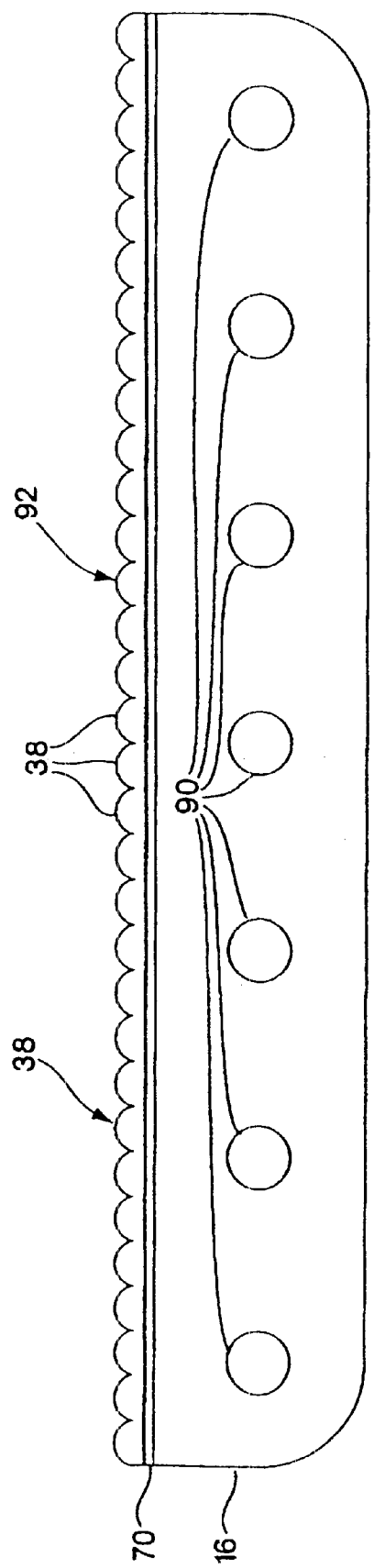

Referring now to FIG. 6, it will be appreciated that in order to eliminate the necessity of providing a reflective array to obtain a panel of collimated light a number of fluorescent tubes 90 can be provided, or the tube can be serpentine in nature. This in essence provides a panel of uncollimated light. This light is reflected by reflector 16 towards the collimating sheet 70 and thence, in this embodiment, rather than to a reflective array, directly to a sheet 92 carrying the cylindrical collimating lenses 38.

It will be appreciated that either for the folded reflective array of FIG. 1 or for the directly illuminated array of FIG. 4, the interface between the reflective array and the cylindrical lens array is to be provided by an adhesive material which has an index of refraction less than either of the two interfaced elements. The purpose of this is to provide the required internal reflection.

What is now presented is a program listing for the parabolic surfaces of waveguide 10 of FIG. 1:

```
!!*************************************************************************************
!!****   DIVERGENCE REDUCING EMITTING WAVEGUIDE VIA SURFACE RELIEF AND         ****
!!****   LAMINATED ACRYLIC SUBSTRATES. THE WAVEGUIDE ACCEPTS TWO               ****
!!****   LOW DIVERGENCE (+/- 3 DEGREES) SOURCES.                               ****
!!****       THE SOURCES CONSIST OF TWO NON-IMAGING COLLIMATOR SECTIONS.       ****
!!****       EACH SECTION HAS 4 ANGLE CONVERTING CPC SEGMENTS FOR UNIFORMITY.
****
!!*************************************************************************************
$ECHO ALL
UNITS UM
XMEMORY NORM
ACCURACY LOW
BEAM INCOHERENT GEOMETRIC
NRAY=1E5
CUTOFF (1/(NRAY))/1000
HALT 1000
SEED=200000001
WAVELENGTH 0.486 0.589 0.686
MEDIA; 1.497 1.491 1.489 'ACRYLIC'     !! INDEXES ARE FROM TABLE IN HANDBOOK OF
PLASTIC OPTICS
MEDIA; 1.43 'EPOXY'
MEDIA; 1.0 'AIR'
COATINGS; 1 0 'ALUM'
COATINGS; .85 .15 'ALUM1'
FRESNEL AVERAGE
SPLIT 1
DIV_X=10     !!DIVERGENC IN X PLANE IN DEGREES
WG_L=8.4*25.4*1000     !!WAVEGUIDE LENGTH
WG_TH=12800     !!TIR WAVEGUIDE THICKNESS
EP_TH=50     !!EPOXY THICKNESS
LN_TH=5000     !!LENS SUBSTRATE THICKNESS
PI=ACOS(-1.0)
NP=1.491     !!INDEX OF REFRACTION IN ACRYLIC
NE=1.43     !!INDEX OF REFRACTION OF EPOXY
N1=((NP)*((WG_TH)+(LN_TH))+(NE)*(EP_TH))/((WG_TH)+(EP_TH)+(LN_TH))
DIV_IN=3*(PI)/180     !!WAVEGUIDE INPUT DIVERGENCE HALF ANGLE (RAD)
DIV_OT=(0.27*(PI)/180)     !!OUTPUT DIVERGENCE HALF ANGLE (RAD)
RW=ABS(((WG_TH)+(EP_TH)+(LN_TH))*TAN(DIV_OT))     !! REFLECTIVE RELIEF WIDTH
LW=ABS(((WG_TH)+(EP_TH)+(LN_TH))*TAN(DIV_IN))     !! LENS HALF WIDTH
LR=ABS(((WG_TH)+(EP_TH)+(LN_TH)-2500)*(((N1)-1)/(N1)))     !! LENS RADIUS, RADIUS
TAKEN AT AVERAGE DEPTH
LTH1=(LR)-((LR^2-(LW)^2)^0.5     !! LENS THICKNESS
BW=(LW)-(RW)/2
PHI=ASIN(1/(NP))     !! ENTERANCE ANGLE FOR LIGHT TO DIELECTRIC OF COLLIMATOR
A1=5500     !! HALF LENGTH OF THE SOURCE
A=19750     !! HALF LENGTH OF THE EXIT APPERATURE
THET=ASIN((A1)*SIN(PHI)/(A))     !! HALF ANGLE OF THE COLLIMATION ON THE LONG
SIDE
F=(A1)*(SIN(PHI)+SIN(THET))     !! FOCAL LENGTH OF PARABOLA
QR=(2*(A1)*COS(.5*((PHI)-(THET))))/SIN(.5*((PHI)+(THET)))
R=(QR)*COS(PHI)
L=((A)+(A1))/TAN(THET)     !! LENGTH OF CPC COLLIMATING SECTION
D1=500     !! HALF SOURCE WIDTH
D=6400     !! HALF EXIT APPERATURE WIDTH
THET1=ASIN((D1)*SIN(PHI)/(D))     !! HALF ANGLE OF COLLIMATION ON THE SHORT SIDE
F2=(D1)*(SIN(PHI)+SIN(THET1))     !! FOCAL LENGTH FOR THE PARABOLIC COLLIMATING
SECTION ON THE SHORT SIDE
QR1=(2*(D1)*COS(.5*((PHI)-(THET1))))/SIN(.5*((PHI)+(THET1)))     !! USED TO
CALCULATE R1
R1=(QR1)*COS(PHI)     !! THIS THE THE DISTANCE FROM THE XY PLANE THAT THE
PARABOLIC SECTION WILL START ON THE SHORT SIDE
L1=((D)+(D1))/TAN(THET1)     !! LENGTH OF PARABOLIC COLLIMATING SECTION
QR2=(4*(D1)^2+(QR)^2-4*(D1)*(QR)*COS((PI)/2-(PHI)))^.5
FE=180000
NL=2540     !! NL IS THE NECK LENGTH BETWEEN THE TWO TURNING MIRRORS
NL1=14986
WG_W=2*(A)
KAPPA=(PHI)-(THET)
KAPPA1=(PHI)-(THET1)
AMP=1     !! AMPLITUDE OF MODULATING FUNCTION IN MICRONS, FOR TOLERANCE ANALYSIS
T=1     !! PERIOD OF MODULATING FUNCTION IN MICRONS, FOR TOLERANCE ANALYSIS
ROUGH=0.01     !! RMS ROUGHNESS OF SURFACE. MULTIPLY THIS TIMES THE WAVELENGTH TO
GET RMS ROUGHNESS
$IO OUT ABLDATA3
$REG A1
$REG A
$REG R
$REG F
$REG KAPPA
```

-continued

```
$REG D1
$REG D
$REG R1
$REG F2
$REG L
$REG L1
$REG LR
$REG KAPPA1
$IO OUT CLOSE
$GO end
!!*****************************GEOMETRY DATABASE*****************************
!!*****************************LENS ARRAY/REFLECTIVE ARRAY*****************************
COUNT=1
LWTOT=0
RWTOT=0
!!
!!
!!
!!
!!
RW=ABS(((WG_TH)+(EP_TH)+(LN_TH)-(RWTOT))*TAN(DIV_OT))    !! RW=REFLECTIVE RELIEF
WIDTH
LW=((WG_TH)+(EP_TH)+(LN_TH)-(RWTOT))*TAN(DIV_IN)-(RW)/2    !! LENS HALF WIDTH
$IF (COUNT) EQ 1; LW1=(LW)
LTH=(LR)-((LR)^2-(LW)^2)^0.5    !! LENS THICKNESS
BW=(LW)-(RW)/2
$IO OUT ABLDATA    +12
$REG COUNT
$REG LW
$REG LWTOT
$REG LW1
$REG RW
$REG RWTOT
$REG LR
$IO OUT CLOSE
SURFACE
    PLANE Y (RWTOT) RECTANG (BW)/2 (WG_W)
        SHIFT Z 0.5*(BW)+(LWTOT)
    PLANE Y 0 RECTANG ((RW)/(COS((PI)/4)))/2 (WG_W)
        ROTATE X -(45) 0 0
        SHIFT Z (BW)+(RW)/2+(LWTOT)
        SHIFT Y (RW)/2+(RWTOT)
    PLANE Y (RWTOT)+(RW) RECTANG (BW)/2 (WG_W)
        SHIFT Z 3*(BW)/2+(RW)+(LWTOT)
    GENERAL 0 0 0
      C -1*((LR)^2)
      Y2 1
      Z2 1
      LOCAL -(WG_W) (WG_W) SQRT((LR)^2-(LW)^2) (LR)+1 -(LW) (LW)
      SHIFT Y (WG_TH)+(EP_TH)+(LN_TH)-(LR)-(LTH1)+(LTH)
      SHIFT Z (LW)+(LWTOT)
OBJECT; 0.4 0, 0.3 0, 0.2 0, 0.1 0
    INTERFACE COATING 0 ACRYLIC 0
RWTOT=(RWTOT)+(RW)    !! RWTOT=TOTAL DEPTH CHANGE
LWTOT=(LWTOT)+2*(LW)    !! LWTOT=TOTAL LENSES WIDTH
COUNT=(COUNT)+1
$IF (LWTOT) LE (WG_L)/2; $GO -40
$IO OUT ABLDATA +12
$REG COUNT
$REG LW
$REG LWTOT
$REG LW1
$REG RW
$REG RWTOT
$GO end
SURFACE
    PLANE Y 0 RECT 1E4 (WG_W)
        SHIFT Z -1E4
    PLANE Y 0 RECT 1E4 (WG_W)
        SHIFT Z -1E4
        SHIFT Y (WG_TH)+(EP_TH)+(LN_TH)-(LTH1)
OBJECT; 0.2 0, 0.1 0
    INTERFACE COATING 0 ACRYLIC 0
SURFACE
    PLANE Y 0 RECT (LWTOT)/2+1E4 (WG_W)
        SHIFT Z (LWTOT)/2-1E4
        SHIFT Y (WG_TH)
```

```
    PLANE Y 0 RECT (LWTOT)/2+1E4 (WG_W)
        SHIFT Z (LWTOT)/2-1E4
        SHIFT Y (WG_TH)+(EP_TH)
OBJECT; 0.2 0, 0.1 0
    INTERFACE COATING 0 ACRYLIC EPOXY
WG_L = (LWTOT)
SURFACE
    PLANE Z 0 RECT (WG_W) (WG_TH)/2
        SHIFT Z -2E4
        SHIFT Y (WG_TH)/2
OBJECT; 0.1
    INTERFACE COATING 0 ACRYLIC EPOXY
SURFACE
    PLANE Z 0 RECT (WG_W) (WG_TH)/2-(RWTOT)/2
        SHIFT Z (WG_L)
        SHIFT Y (WG_TH)/2-(RWTOT)/2+(RWTOT)
OBJECT; 0.1
SURFACE
    PLANE Z 0 RECT (WG_W) ((EP_TH)+(LN_TH))/2
        SHIFT Z -2*1E4
        SHIFT Y ((EP_TH)+(LN_TH))/2+(WG_TH)
    PLANE Z 0 RECT (WG_W) ((EP_TH)+(LN_TH))/2
        SHIFT Z (WG_L)
        SHIFT Y ((EP_TH)+(LN_TH))/2+(WG_TH)
OBJECT; 0.2 0, 0.1 0
    INTERFACE COATING -ALUM
SURFACE
    PLANE X (WG_W) RECTANG ((WG_TH)+(EP_TH)+(LN_TH))/2 (WG_L)/2+1E4
        SHIFT Z (WG_L)/2-1E4
        SHIFT Y ((WG_TH)+(EP_TH)+(LN_TH))/2
    PLANE X -(WG_W) RECTANG ((WG_TH)+(EP_TH)+(LN_TH))/2 (WG_L)/2+1E4
        SHIFT Z (WG_L)/2-1E4
        SHIFT Y ((WG_TH)+(EP_TH)+(LN_TH))/2
OBJECT; 0.2 0, 0.1 0
    INTERFACE COATING -ALUM
SURFACE
    TUBE Z -2E4-(EP_TH) 2*(A) (D) -2E4 2*(A) (D) 1 1
OBJECT; 0.1
    INTERFACE COATING -ALUM
    SHIFT Y (D)
SURFACE
    PLANE Y -10
OBJECT; 0.1
    LIMITS -(WG_W) (WG_W) -11 -9 -1E4 (WG_L)+1E4
ahead
!!*********************************** Start collimator section ***************************************
$DO 1 2
{
SURFACE
    GENERAL 0 0 0
            X2 1
            Z -4*(F)
        SHIFT Z -(F)
        ROTATE Y -180*(THET)/(PI) 0 0
        SHIFT X -(A1)
    GENERAL 0 0 0
            X2 1
            Z -4*(F)
        SHIFT Z -(F)
        ROTATE Y -180*(THET)/(PI) 0 0
        SHIFT X -(A1)
        ROTATE Z 180 0 0
    PLANE Y (D)
    PLANE Y -(D)
    PLANE Z (L1)
    PLANE Z (L)
OBJECT; 0.6 -1, 0.5 -1, 0.3 1, 0.4 -1 'MCPC1-4'
    INTERFACE COATING -ALUM
    BOUNDS 0.2 -0.1
    ROUGHNESS (ROUGH)
SURFACE
    GENERAL 0 0 0
            X2 1
            Z -4*(F)
        SHIFT Z -(F)
        ROTATE Y -180*(THET)/(PI) 0 0
        SHIFT X -(A1)
```

```
        GENERAL 0 0 0
               X2 1
               Z -4*(F)
           SHIFT Z -(F)
           ROTATE Y -180*(THET)/(PI) 0 0
           SHIFT X -(A1)
           ROTATE Z 180 0 0
        GENERAL 0 0 0
               Y2 1
               Z -4*(F2)
           SHIFT Z -(F2)
           ROTATE X 180*(THET1)/(PI) 0 0
           SHIFT Y -(D1)
        GENERAL 0 0 0
               Y2 1
               Z -4*(F2)
           SHIFT Z -(F2)
           ROTATE X 180*(THET1)/(PI) 0 0
           SHIFT Y -(D1)
           ROTATE Z 180 0 0
        PLANE Z (R)
        PLANE Z (L1)
OBJECT; 0.6 'MCPC1-3A'
        INTERFACE COATING -ALUM
        BOUNDS 0.2 -0.1 -0.3 -0.4 -0.5
        ROUGHNESS (ROUGH)
SURFACE
        GENERAL 0 0 0
               X2 1
               Z -4*(F)
           SHIFT Z -(F)
           ROTATE Y -180*(THET)/(PI) 0 0
           SHIFT X -(A1)
        GENERAL 0 0 0
               X2 1
               Z -4*(F)
           SHIFT Z -(F)
           ROTATE Y -180*(THET)/(PI) 0 0
           SHIFT X -(A1)
           ROTATE Z 180 0 0
        GENERAL 0 0 0
               Y2 1
               Z -4*(F2)
           SHIFT Z -(F2)
           ROTATE X 180*(THET1)/(PI) 0 0
           SHIFT Y -(D1)
        GENERAL 0 0 0
               Y2 1
               Z -4*(F2)
           SHIFT Z -(F2)
           ROTATE X 180*(THET1)/(PI) 0 0
           SHIFT Y -(D1)
           ROTATE Z 180 0 0
        PLANE Z (R)
        PLANE Z (L1)
OBJECT; 0.5 'MCPC1-3B'
        INTERFACE COATING -ALUM
        BOUNDS 0.2 -0.1 -0.3 -0.4 -0.6
        ROUGHNESS (ROUGH)
SURFACE
        GENERAL 0 0 0
               X2 1
               Z -4*(F)
           SHIFT Z -(F)
           ROTATE Y -180*(THET)/(PI) 0 0
           SHIFT X -(A1)
        GENERAL 0 0 0
               X2 1
               Z -4*(F)
           SHIFT Z -(F)
           ROTATE Y -180*(THET)/(PI) 0 0
           SHIFT X -(A1)
           ROTATE Z 180 0 0
        GENERAL 0 0 0
               Y2 1
               Z -4*(F2)
           SHIFT Z -(F2)
           ROTATE X 180*(THET1)/(PI) 0 0
           SHIFT Y -(D1)
```

-continued

```
    GENERAL 0 0 0
        Y2 1
        Z -4*(F2)
      SHIFT Z -(F2)
      ROTATE X 180*(THET1)/(PI) 0 0
      SHIFT Y -(D1)
      ROTATE Z 180 0 0
    PLANE Z (R)
    PLANE Z (L1)
OBJECT; 0.4 'MCPC1-3C'
    INTERFACE COATING -ALUM
    BOUNDS 0.2 -0.1 -0.3 -0.5 -0.6
    ROUGHNESS (ROUGH)
SURFACE
    GENERAL 0 0 0
        X2 1
        Z -4*(F)
      SHIFT Z -(F)
      ROTATE Y -180*(THET)/(PI) 0 0
      SHIFT X -(A1)
    GENERAL 0 0 0
        X2 1
        Z -4*(F)
      SHIFT Z -(F)
      ROTATE Y -180*(THET)/(PI) 0 0
      SHIFT X -(A1)
      ROTATE Z 180 0 0
    GENERAL 0 0 0
        Y2 1
        Z -4*(F2)
      SHIFT Z -(F2)
      ROTATE X 180*(THET1)/(PI) 0 0
      SHIFT Y -(D1)
    GENERAL 0 0 0
        Y2 1
        Z -4*(F2)
      SHIFT Z -(F2)
      ROTATE X 180*(THET1)/(PI) 0 0
      SHIFT Y -(D1)
      ROTATE Z 180 0 0
    PLANE Z (R)
    PLANE Z (L1)
OBJECT; 0.3 'MCPC1-3D'
    INTERFACE COATING -ALUM
    BOUNDS 0.2 -0.1 -0.4 -0.5 -0.6
    ROUGHNESS (ROUGH)
SURFACE
    GENERAL 0 0 0
        Y2 1
        Z -4*(F2)
      SHIFT Z -(F2)
      ROTATE X 180*(THET1)/(PI) 0 0
      SHIFT Y -(D1)
    GENERAL 0 0 0
        Y2 1
        Z -4*(F2)
      SHIFT Z -(F2)
      ROTATE X 180*(THET1)/(PI) 0 0
      SHIFT Y -(D1)
      ROTATE Z 180 0 0
    PLANE X 0
      ROTATE Y -90*((PHI)-(THET))/(PI)
      SHIFT X -(A1)
    PLANE X 0
      ROTATE Y 90*((PHI)-(THET))/(PI)
      SHIFT X (A1)
    PLANE Z (R1)
    PLANE Z (R)
OBJECT; 0.3 -1, 0.4 1, 0.5 -1, 0.6 -1 'MCPC1-2'
    INTERFACE COATING -ALUM
    BOUNDS 0.2 -0.1
    ROUGHNESS (ROUGH)
SURFACE
    PLANE Y 0
      ROTATE X -90*((PHI)-(THET1))/(PI)
      SHIFT Y (D1)
    PLANE Y 0
      ROTATE X 90*((PHI)-(THET1))/(PI)
      SHIFT Y -(D1)
```

```
    PLANE X 0
        ROTATE Y -90*((PHI)-(THET))/(PI)
        SHIFT X -(A1)
    PLANE X 0
        ROTATE Z 180
        ROTATE Y 90*((PHI)-(THET))/(PI)
        SHIFT X (A1)
    PLANE Z 0
    PLANE Z (R1)
OBJECT; 0.3 'MCPC1-1A'
    INTERFACE COATING -ALUM
    BOUNDS 0.5 -0.6
    LIMITS -(D) (D) -(A) (A) 0 (R1)
    ROUGHNESS (ROUGH)
OBJECT; 0.4 'MCPC1-1B'
    INTERFACE COATING -ALUM
    BOUNDS 0.5 -0.6
    LIMITS -(D) (D) -(A) (A) 0 (R1)
    ROUGHNESS (ROUGH)
OBJECT; 0.5 'MCPC1-1C'
    INTERFACE COATING -ALUM
    BOUNDS 0.3 0.4
    LIMITS -(D) (D) -(A) (A) 0 (R1)
    ROUGHNESS (ROUGH)
OBJECT; 0.6 'MCPC1-1D'
    INTERFACE COATING -ALUM
    BOUNDS 0.3 0.4
    LIMITS -(D) (D) -(A) (A) 0 (R1)
    ROUGHNESS (ROUGH)
SURFACE
    PLANE Z 0 RECTANG (A1) (D1)
OBJECT; 0.1 'MCPC1-1E'0
    INTERFACE COATING BARE_SUBSTRATE 0 ACRYLIC
    ROUGHNESS (ROUGH)
SURFACE
    PLANE Z -1 RECTANG (A1) (D1)
OBJECT; 0.1 'MCPC1-1E'0
    INTERFACE COATING -ALUM1
    ROUGHNESS (ROUGH)
SURFACE
    TUBE Z -1 (A1) (D1) 0 (A1) (D1) 1 1
OBJECT; 0.1
    INTERFACE COATING -ALUM1
    ROUGHNESS (ROUGH)
GROUP -12
    ROTATE Y 180 0 0
GROUP -12
    SHIFT X -(A)+2*(A)*((?)-1)
GROUP -12
    SHIFT Y -(D)-(NL)
GROUP -12
    SHIFT Z (FE)-2E4
}
SURFACE
    TUBE Z (L) 2*(A) (D) (FE) 2*(A) (D) 1 1
OBJECT; 0.1
    INTERFACE COATING -ALUM
    ROUGHNESS (ROUGH)
    ROTATE Y 180 0 0
    SHIFT Y -(D)-(NL)
    SHIFT Z (FE)-2E4
!!*************** END CPC COLLIMATING SECTION, BEGIN TURNING MIRRORS *****************
SURFACE
    PLANE Z (FE) RECTANG (WG_W) (D)
OBJECT; 0.1
    INTERFACE COATING BARE_SUBSTRATE ACRYLIC EPOXY
SURFACE
    PLANE Z (FE)+(EP_TH) RECTANG (WG_W) (D)
OBJECT; 0.1
    INTERFACE COATING BARE_SUBSTRATE ACRYLIC EPOXY
SURFACE
    TUBE Z (FE) (WG_W) (D) (FE)+(EP_TH) (WG_W) (D) 1 1
OBJECT; 0.1
    INTERFACE COATING -ALUM
SURFACE
    PLANE Y 0
        ROTATE X -45 0 0
        SHIFT Z (FE)+(EP_TH)
        SHIFT Y -(D)
```

-continued

```
OBJECT; 0.1
    LIMITS -(WG_W) (WG_W) -(D) (D) (FE)+(EP_TH) (FE)+2*(D)+(EP_TH)
    INTERFACE COATING -ALUM
SURFACE
    PLANE Y 0
        ROTATE X -45 0 0
        SHIFT Z (FE)+(EP_TH)
        SHIFT Y -(D)
    PLANE X (WG_W)
OBJECT; 0.1
    BOUNDS 0.2
    LIMITS (WG_W)-1 (WG_W)+1 -(D) (D) (FE)+(EP_TH) (FE)+2*(D)+(EP_TH)
    INTERFACE COATING -ALUM
SURFACE
    PLANE Y 0
        ROTATE X -45 0 0
        SHIFT Z (FE)+(EP_TH)
        SHIFT Y -(D)
    PLANE X -(WG_W)
OBJECT; 0.1
    BOUNDS 0.2
    LIMITS -(WG_W)-1 -(WG_W)+1 -(D) (D) (FE)+(EP_TH) (FE)+2*(D)+(EP_TH)
    INTERFACE COATING -ALUM
SURFACE
    TUBE Y (D) (D) (WG_W) (D)+(NL) (D) (WG_W) 1 1
OBJECT; 0.1
    SHIFT Z (FE)+(D)+(EP_TH)
    INTERFACE COATING -ALUM
SURFACE
    PLANE Z 0
        ROTATE X -45 0 0
        SHIFT Z (FE)+2*(D)+(EP_TH)
        SHIFT Y (D)+(NL)
OBJECT; 0.1
    LIMITS -(WG_W) (WG_W) (D)+(NL) 3*(D)+(NL) (FE)+(EP_TH) (FE)+2*(D)+(EP_TH)
    INTERFACE COATING -ALUM
SURFACE
    PLANE Z 0
        ROTATE X -45 0 0
        SHIFT Z (FE)+2*(D)+(EP_TH)
        SHIFT Y (D)+(NL)
    PLANE X -(WG_W)
OBJECT; 0.1
    BOUNDS -0.2
    LIMITS -(WG_W)-1 -(WG_W)+1 (D)+(NL) 3*(D)+(NL) (FE)+(EP_TH)
(FE)+2*(D)+(EP_TH)
    INTERFACE COATING -ALUM
SURFACE
    PLANE Z 0
        ROTATE X -45 0 0
        SHIFT Z (FE)+2*(D)+(EP_TH)
        SHIFT Y (D)+(NL)
    PLANE X (WG_W)
OBJECT; 0.1
    BOUNDS -0.2
    LIMITS (WG_W)-1 (WG_W)+1 (D)+(NL) 3*(D)+(NL) (FE)+(EP_TH) (FE)+2*(D)+(EP_TH)
    INTERFACE COATING -ALUM
SURFACE
    PLANE Z (FE)+(EP_TH)
OBJECT; 0.1
    LIMITS -(WG_W) (WG_W) (D)+(NL) 3*(D)+(NL) (FE)+(EP_TH)-1 (FE)+(EP_TH)+1
    INTERFACE COATING 0 ACRYLIC EPOXY
GROUP -11
    ROTATE Y 180 0 0
GROUP -11
    SHIFT Y -(D)-(NL)
GROUP -11
    SHIFT Z (FE)-2E4
!!************************* END TURNING MIRROR SECTION ************************************
SURFACE
    PLANE Y ((WG_TH)+(EP_TH)+(LN_TH)+10)
OBJECT; 0.1 'DETECTOR'
 LIMITS         -(WG_W)        (WG_W)       ((WG_TH)+(EP_TH)+(LN_TH)+10)-1
((WG_TH)+(EP_TH)+(LN_TH)+10)+1 0 (WG_L)
$DO 113 200
{
!! NOTE:   CUTOFF SET TO .1% OF AVERAGE RAY FLUX
!!         100K RAYS PER ITERATION INTO SYSTEM
!!         SPLIT SET TO 1
```

-continued

```
!!      TEST TO LOOK AT INTENSITY DISTRIBUTION
!!      NEW STAIR STEP REFLECTIVE ARRAY, LENS RADIUS STAYS CONSTANT,
!!      END REFLECTORS NOW ABSORBING
!!      RECTANGULAR OUTPUT IN ANGLE SPACE (CORRECTED LIGHT INPUT)
!!      REFLECTIVE ARRAY NOW MADE OF ACRYLIC
APPLE=(?)
SEED=(SEED)+(2E7*(APPLE)*(NRAY))
WAVELENGTH 0.486 0.589 0.686
!!*****************************SOURCE DATABASE*****************************
EMITTING RECT Z -0.1 (A1) (D1) number of rays (NRAY)
    SHIFT X -(A)
    ROTATE Y 180 0 0
    SHIFT Y -(D)-(NL)
    SHIFT Z (FE)-2E4
EMITTING RECT Z -0.1 (A1) (D1) number of rays (NRAY)
    SHIFT X -(A)+2*(A)
    ROTATE Y 180 0 0
    SHIFT Y -(D)-(NL)
    SHIFT Z (FE)-2E4
!!*******************************ANALYSIS*********************************
next
CONSIDER ALL
PIXEL 100
WIN X -(WG_W) (WG_W) Z 0 (WG_L)
TRACE
STATS
CONSIDER ONLY DETECTOR
SPOT POS ATTRIB 0
DISPLAY
$IF (APPLE) EQ (1.0) THEN
    WRITE ABLPOS1
$ELSE
    COMBINE ABLPOS1 1
    WRITE ABLPOS1
$ENDIF
DISPLAY ABLPOS1
ISO
CONT
}
finish
$GO end
WIN Y Z
PIXEL 100
PROFILE OVERLAY
TRACE PLOT
end
END
```

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. Apparatus for collimating light from a light source in which light is reflected from the light source towards an exit slit having a long and a short axis, comprising:
    a collimator positioned adjacent said exit slit and including an optical waveguide with an entrance aperture and parabolic surfaces adjacent said entrance aperture which redirects the light from said exit slit so as to provide collimated light in a direction perpendicular to the long axis of said exit slit out the exit aperture thereof, said parabolic surfaces being opposed and having as a focus an opposing long edge of said exit slit; and,
    a reflective array spreading out the collimated light exiting said waveguide without losing said collimation so as to provide a panel of light exiting said panel in a preferred direction in which the light exiting said panel is highly collimated in at least one direction, and wherein said reflective array includes an optical waveguide having a stepped back surface to provide said reflective array with a taper, said reflective array having an entrance aperture and a wide end at said entrance aperture, said stepped back surface having about 45° angles at each step, with said stepped back surface providing said taper.

2. The apparatus of claim 1, and further including an array of cylindrical lenses each having a long axis, said array of cylindrical lenses being adjacent said panel for further collimating the light exiting said panel in a direction perpendicular to the long axis of said cylindrical lenses.

3. The apparatus of claim 1, wherein the surface of said reflective array spaced from said stepped, back surface includes a cylindrical array of lenses for further collimating the light exiting said array.

4. The apparatus of claim 1, wherein said waveguide includes a sheet having a number of side-by-side parabolas therein, each of said parabolas having an entrance aperture corresponding to said exit slit, each of said parabolas in said sheet having a parabolic surface with a focus at an opposing edge of the corresponding entrance aperture.

5. The apparatus of claim 4, wherein said light source includes a number of fluorescent tubes.

6. The apparatus of claim 4, wherein said light source includes a serpentine fluorescent tube.

7. The apparatus of claim 4, wherein said entrance apertures are in the micron range.

8. The apparatus of claim 1, wherein said collimator is a crossed parabolic structure having parabolic surfaces orthogonal to said spaced parabolic surfaces, with each of said orthogonally-oriented surfaces having a focus at an opposing short edge of said exit slit.

9. The apparatus of claim 1, wherein said waveguide is filled with a light transmissive material.

10. The apparatus of claim 9, wherein said light transmissive material is glass.

11. The apparatus of claim 9, wherein said light transmissive material is acrylic.

12. The apparatus of claim 9, wherein said spaced parabolic surfaces internally reflect light traveling down said waveguide.

13. The apparatus of claim 1, and further including means between the exit aperture of said waveguide and said spreading means for folding the collimated light from said waveguide back towards said light source, thereby to provide a folded collimator for minimizing the size thereof.

* * * * *